(12) United States Patent
Shemtov

(10) Patent No.: US 9,995,419 B1
(45) Date of Patent: Jun. 12, 2018

(54) COUPLING ASSEMBLY WITH WATERTIGHT FEATURE FOR SECURING CONDUITS TOGETHER

(71) Applicant: Atkore Steel Components, Inc., Coconut Creek, FL (US)

(72) Inventor: Sami Shemtov, Hollywood, FL (US)

(73) Assignee: ATKORE STEEL COMPONENTS, INC., Coconut Creek, FL (US)

( * ) Notice: Subject to any disclaimer, the term of this patent is extended or adjusted under 35 U.S.C. 154(b) by 453 days.

(21) Appl. No.: 14/723,741

(22) Filed: May 28, 2015

(51) Int. Cl.
*F16L 19/08* (2006.01)
*F16L 21/00* (2006.01)

(52) U.S. Cl.
CPC ............. *F16L 19/08* (2013.01); *F16L 21/002* (2013.01)

(58) Field of Classification Search
CPC ................................ F16L 19/08; F16L 21/002
See application file for complete search history.

(56) References Cited

U.S. PATENT DOCUMENTS

| | | | |
|---|---|---|---|
| 4,088,348 A | 5/1978 | Shemtov | |
| 4,159,134 A | 6/1979 | Shemtov | |
| 4,159,859 A | 7/1979 | Shemtov | |
| D287,396 S | 12/1986 | Shemtov | |
| 4,641,863 A | 2/1987 | Shemtov | |
| 5,303,964 A * | 4/1994 | Yi | F16L 19/08 285/322 |
| 5,524,905 A | 6/1996 | Thoman et al. | |
| D376,415 S | 12/1996 | Shemtov | |
| 5,769,466 A | 6/1998 | Noel et al. | |
| 6,476,319 B1 | 11/2002 | Shemtov | |
| 6,808,181 B1 | 10/2004 | Shemtov | |
| 6,835,088 B2 | 12/2004 | Shemtov | |
| 6,939,160 B2 | 9/2005 | Shemtov | |
| 6,988,746 B2 * | 1/2006 | Olson | F16L 19/12 285/149.1 |
| 7,002,077 B2 * | 2/2006 | Pyron | F16L 19/061 174/135 |
| 7,048,561 B1 | 5/2006 | Elbaz | |
| 7,126,064 B1 | 10/2006 | Shemtov | |
| 7,374,212 B1 | 5/2008 | Gretz | |
| 7,476,817 B1 | 1/2009 | Shemtov | |
| 7,604,261 B2 * | 10/2009 | Kiely | F16L 19/061 285/248 |

(Continued)

OTHER PUBLICATIONS

PCT International Search Report from PCT/US2016/034727, dated Aug. 25, 2016.

*Primary Examiner* — Benjamin F Fiorello

(57) ABSTRACT

A coupling assembly for securing two conduits together includes a coupling sleeve, a compression nut, and a stop seal ring. The coupling sleeve includes an outwardly-protruding stop flange, and the stop seal ring fits over the coupling sleeve without sliding past the stop flange. The coupling sleeve enters an expanded end of a first conduit until the stop seal ring is squeezed by the stop flange and the conduit. The conduit sleeve is crimped with the first conduit, and the nut with a compression ring therein is screwed onto the conduit sleeve. A second conduit is inserted into the nut and the conduit sleeve, and tightening the nut compresses the compression ring to grip and secure the second conduit. With the stop seal ring squeezed between the stop flange and the first conduit, the coupling assembly protects against rain or other liquids from entering the conduits.

18 Claims, 6 Drawing Sheets

(56) References Cited

U.S. PATENT DOCUMENTS

| | | |
|---|---|---|
| 7,635,816 B1 | 12/2009 | Shemtov |
| 8,113,550 B2 * | 2/2012 | Noto ................... F16L 13/142 |
| | | 285/374 |
| 8,129,631 B1 | 3/2012 | Shemtov |
| 8,129,633 B1 | 3/2012 | Shemtov |
| 8,586,877 B1 | 11/2013 | Shemtov |
| 8,586,881 B1 | 11/2013 | Shemtov |
| 8,646,813 B1 | 2/2014 | Shemtov |
| 9,385,520 B1 * | 7/2016 | Gretz ................... H02G 15/013 |
| 2005/0035594 A1 | 2/2005 | Kiely |
| 2005/0194785 A1 | 9/2005 | Shemtov |
| 2013/0233435 A1 | 9/2013 | Henthorn et al. |
| 2014/0265321 A1 * | 9/2014 | DeCesare ............ H02G 3/0616 |
| | | 285/343 |
| 2016/0097475 A1 | 4/2016 | Shemtov |

* cited by examiner

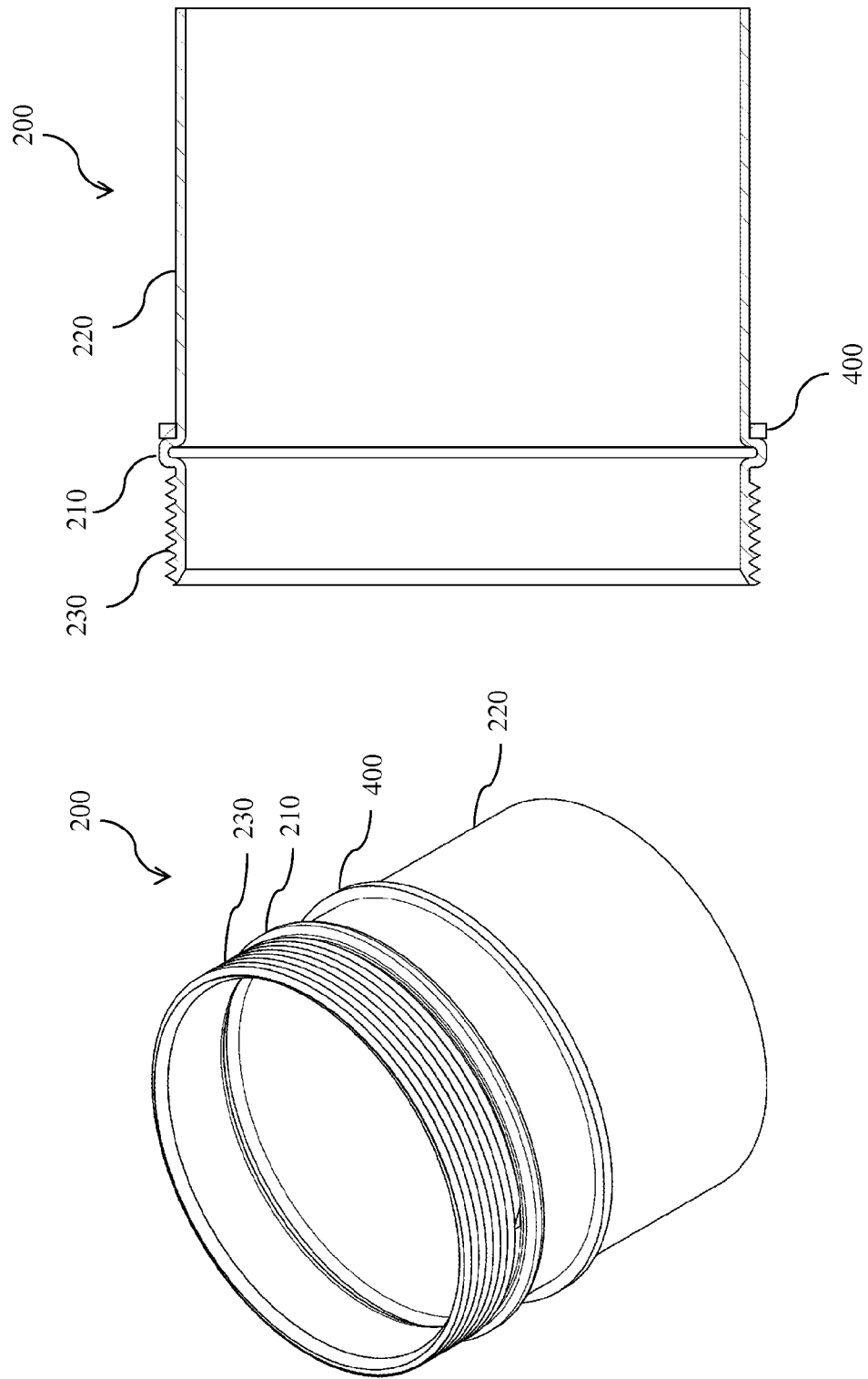

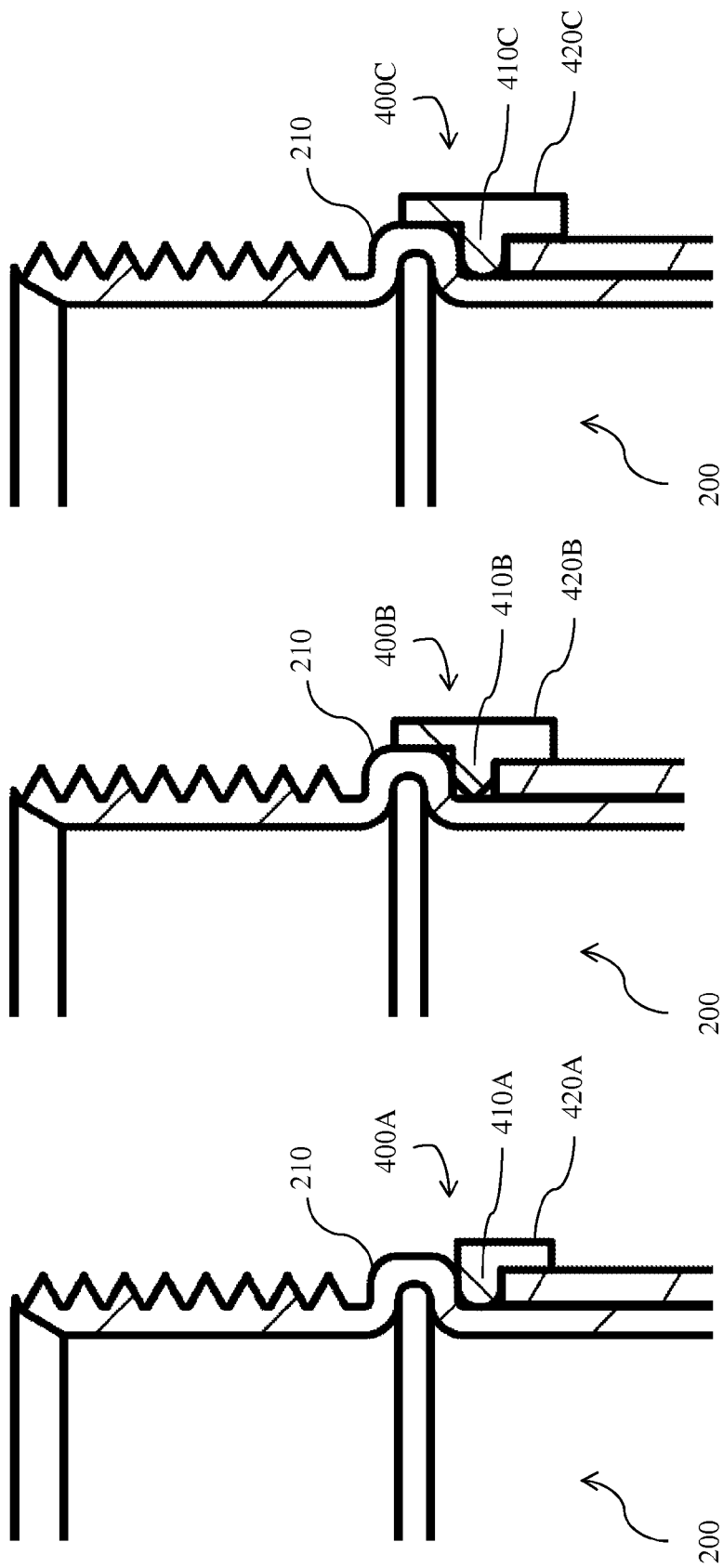

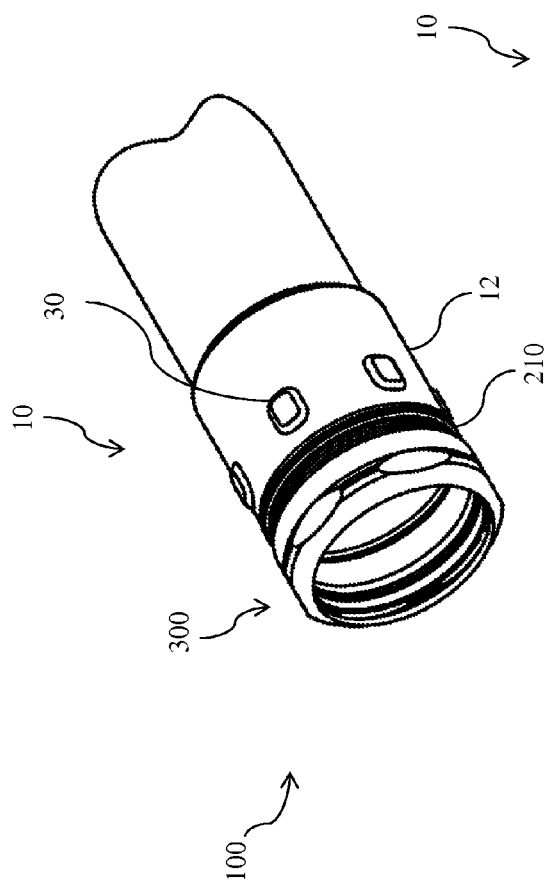
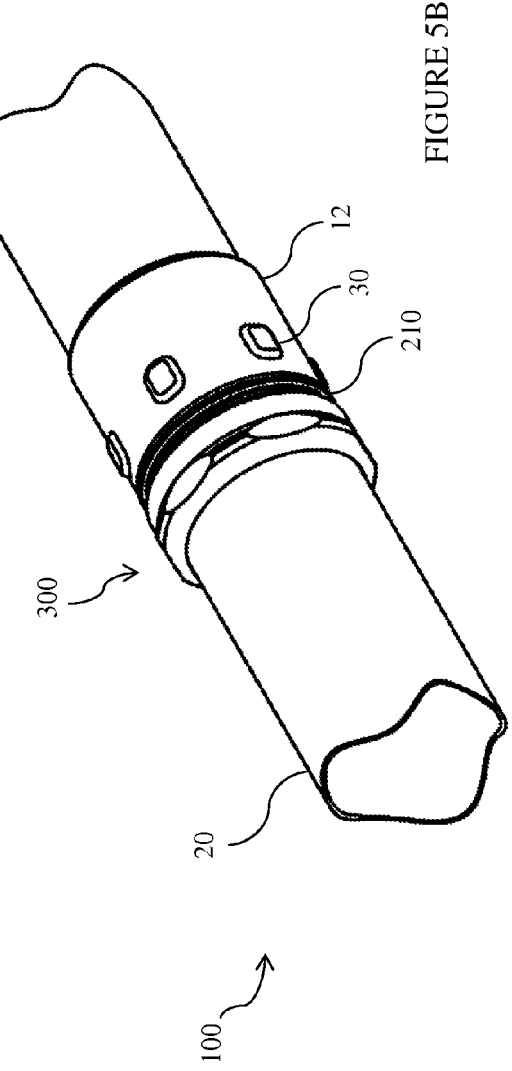

COUPLING ASSEMBLY WITH WATERTIGHT FEATURE FOR SECURING CONDUITS TOGETHER

FIELD OF THE INVENTION

This document concerns an invention relating generally to coupling assemblies for securing conduits, and more specifically to watertight coupling assemblies for splicing two rigid conduits end-to-end.

BACKGROUND OF THE INVENTION

A conduit system may include a set of tubes, pipes, or other conduits for electrical and mechanical wires, connectors, and other components. Conduits may be used to protect electrical or mechanical components in the conduit system. Two rigid conduits can be secured to each other end-to-end using a coupling 1 shown in FIG. 1. One end of the coupling 1 is first inserted into a first conduit 10 having an expanded end portion 12. To secure a second conduit to the coupling 1, the second conduit would be inserted through a nut 3 and a compression ring 5, and into coupling 1. The nut 3 is then screwed onto coupling 1 to compress the compression ring 5 and grip the second conduit. Such an assembly, however, is not watertight. In wet locations where the conduits are exposed to rain, for example, fluids are not restricted from seeping past the coupling and into the conduits. This can damage the components inside the conduits. What is needed is a coupling assembly and method of securing conduits to each other that is convenient to use and that resists rainwater and other liquids.

SUMMARY OF THE INVENTION

The invention, which is defined by the claims set forth at the end of this document, is directed to a coupling assembly and a method of securing conduits together which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring initially to FIGS. 2, 3A, and 3B, an exemplary coupling assembly 100 for water-tightly securing two conduits together end-to-end includes a coupling sleeve 200, a compression nut 300, and a stop seal ring 400. The coupling sleeve 200 includes a stop flange 210 in between a sleeve first segment 220 and an externally-threaded sleeve second segment 230, wherein the stop flange 210 juts out from the coupling sleeve 200. The compression nut 300 includes an internally threaded nut first segment 310 extending from a nut second segment 320, with the nut first segment 310 sized to fit about and screw onto the sleeve second segment 230. The stop seal ring 400 is sized to slide over the sleeve first segment 220 without sliding past the stop flange 210. Referring also to FIGS. 5A, 5B, and 6, to use the coupling assembly 100 to secure a first conduit 10 to a second conduit 20 in a substantially watertight configuration, a user may begin by fitting the stop seal ring 400 about the sleeve first segment 220. The first conduit 10 includes an expanded end portion 12 terminating in a first conduit end 14. The user may insert the sleeve first segment 220 into a first conduit 10 until the stop seal ring 400 is pressed between the stop flange 210 and the first conduit end 14. The coupling sleeve 200 may be secured to the first conduit 10 by using a crimping tool to crimp together the sleeve first segment 220 with the expanded end portion 12. Crimping can make the coupling sleeve 200 and the stop seal ring 400 integral with the conduit 10, and can serve to maintain the stop seal ring 400 securely in place. The compression nut 300 may be turned to threadably engage the nut first segment 310 about the sleeve second segment 230 (see FIG. 5A). A second conduit 20 may be inserted through the compression nut 300 and into the coupling sleeve 200, and the compression nut 300 rotated to further threadably engage the compression nut 300 with the sleeve second segment 230 until the second conduit 20 is tightly gripped (see FIG. 5B). With the compression nut 300 tightened onto the coupling sleeve 200, and the stop seal ring 400 squeezed between the stop flange 210 and the first conduit end 14, the coupling assembly 100 provides a seal against fluid entry into the conduits 10, 20.

Advantageously, splicing the conduits 10, 20 together does not require rotation of either conduit. Further advantages and features of the invention will be apparent from the remainder of this document in conjunction with the associated drawings.

BRIEF DESCRIPTION OF THE DRAWINGS

FIG. 3A is a perspective view of the exemplary coupling sleeve 200 of FIG. 2, with an exemplary stop seal ring 400 fit about the sleeve first segment 220. FIG. 3B is a cross-sectional view of the coupling sleeve 200 and stop seal ring 400 of FIG. 3A.

FIG. 4A is a close-up cross-sectional view of an exemplary stop seal ring 400A that is L-shaped with a stop ring foot portion 410A extending from a stop ring leg portion 420A. FIG. 4B is a close-up cross-sectional view of an exemplary stop seal ring 400B that is T-shaped, with a pointed stop ring protrusion 410B extending from an elongated stop ring body 420B. FIG. 4C is a close-up cross-sectional view of an exemplary stop seal ring 400C that is T-shaped, with a rounded stop ring protrusion 410C extending from a stop ring body 410C.

FIG. 5A shows the exemplary coupling assembly 100 of FIG. 2 with the coupling sleeve 200 crimped with an expanded end portion 12 of the first conduit 10. FIG. 5B shows the exemplary coupling assembly 100 of FIG. 5A with a second conduit 20 secured thereto.

DETAILED DESCRIPTION OF PREFERRED VERSIONS OF THE INVENTION

Figure 1:
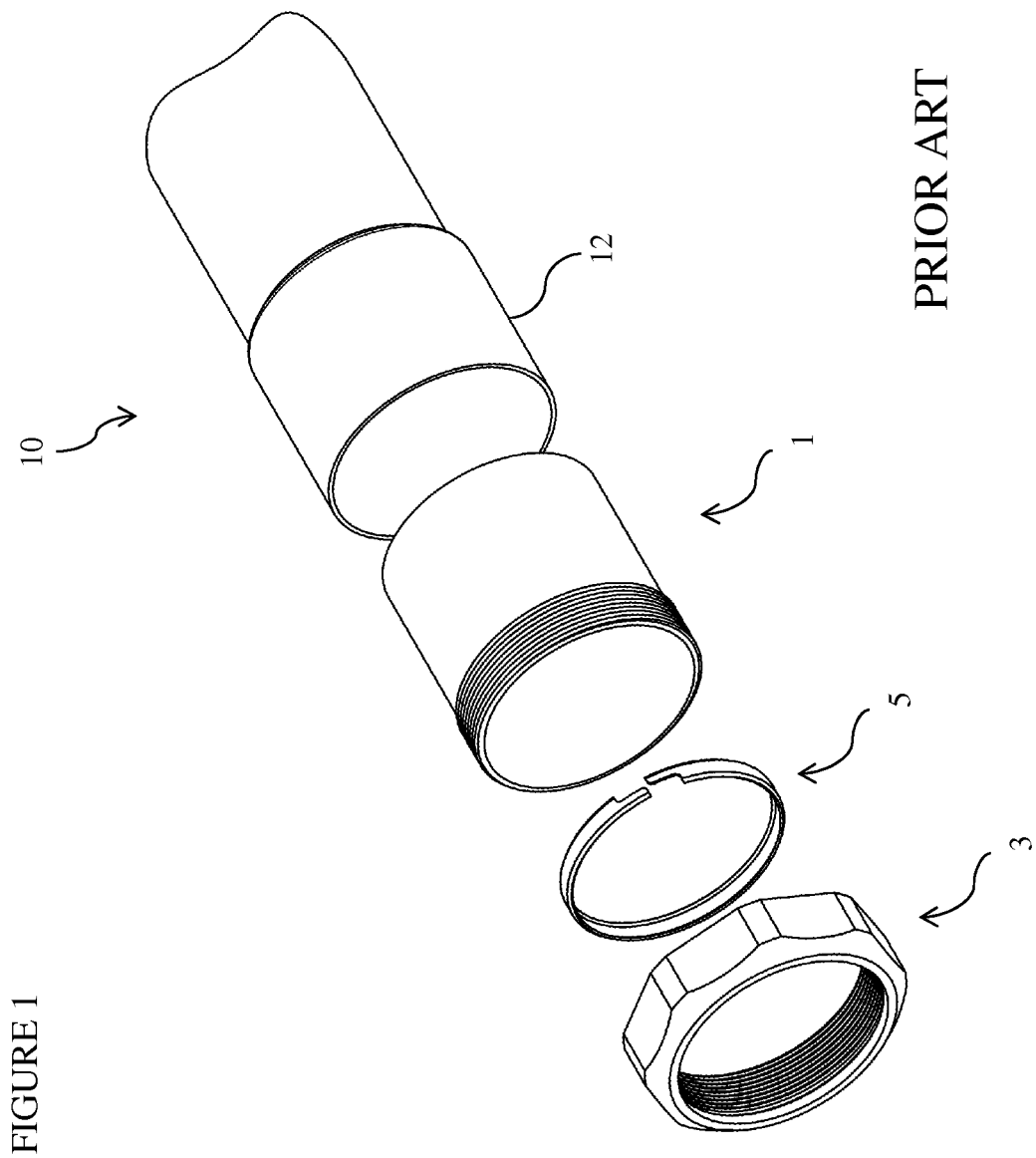
FIG. 1 shows a prior art coupling 1 that fits with a first conduit 10, a nut 3, and a compression ring 5.
Figure 2:
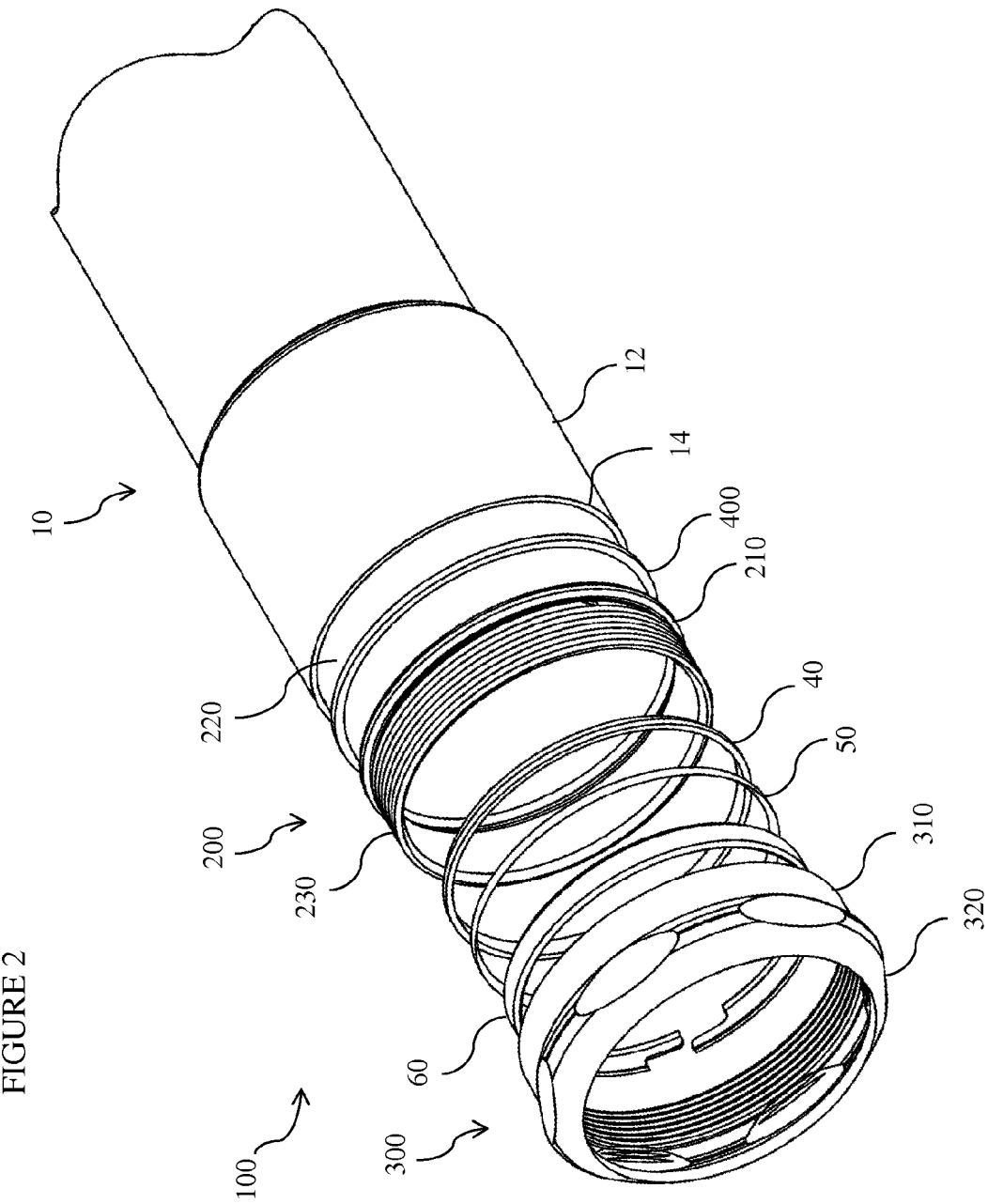
FIG. 2 is an exploded view of an exemplary coupling assembly 100 with a coupling sleeve 200 inserted partway into an expanded end portion 12 of a first conduit 10.
Figure 6:
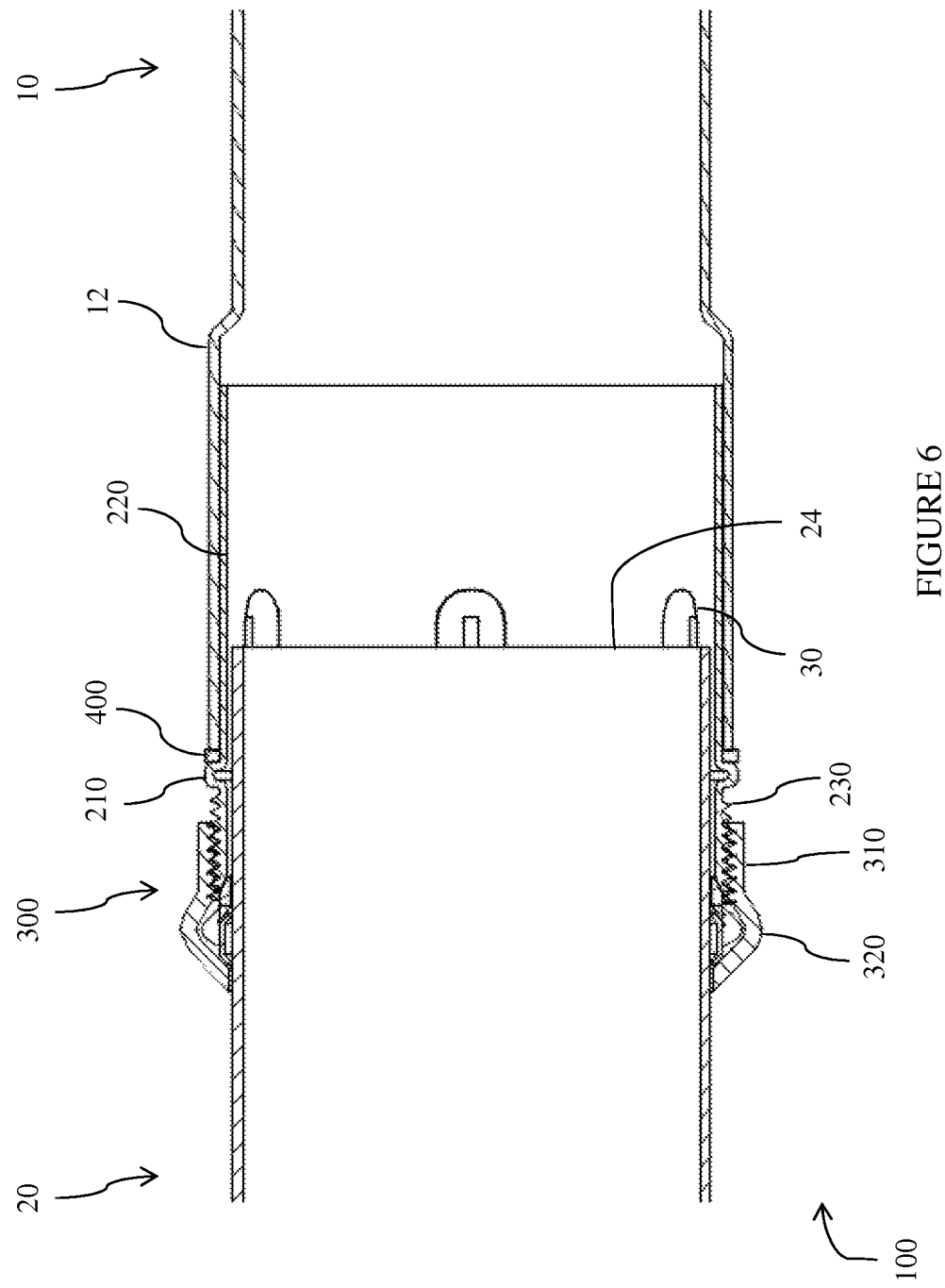
FIG. 6 is a cross-sectional view of the exemplary coupling assembly 100 of FIG. 5B assembled to secure two conduits 10, 20 together.

Returning to FIGS. 5A, 5B, and 6, the first and second conduits 10, 20 being spliced together may each begin as standard straight pipes with uniform diameters. The end of the first conduit 10 may be expanded using a specialized machine to achieve the expanded end portion 12 that has an expanded diameter greater than a first conduit diameter (the first conduit diameter may be the same as a second conduit diameter). The nut first segment 310 has a nut first segment diameter, and the nut second segment 320 has a nut second segment diameter. The nut first segment diameter is greater than the diameter of the sleeve second segment 230, and the nut second segment diameter is greater than the diameter of the second conduit 20. The expanded end portion 12 complementarily receives the sleeve first segment 220 therein. Male and female crimping tools may be pressed together against the first conduit 10 and the coupling sleeve 100, with a female tool against the outside of the expanded end portion 12, and a male tool against the inside of the sleeve first segment 220. Pressing the complementary male and female tools together deforms the sleeve first segment 220 and the expanded end portion 12 to form bumps 30, securing the coupling sleeve 200 to the first conduit 10. The male and female tools may be arranged to achieve bumps 30 that protrude outwardly so as to not take space in the passage inside the conduits.

Once the coupling sleeve 200 and first conduit 10 are secured to each other, the compression nut 300 may be turned about the sleeve second segment 230 to threadably engage the coupling sleeve 200, with a seal ring 40, a friction ring 50, and a compression ring 60 situated within the nut second segment 320. The second conduit 20 may then be slid into the sleeve second segment 230 until a second conduit end 24 of the second conduit 20 passes the stop flange 210 and the second conduit 20 partly overlaps with the first conduit 10. The sleeve first and second segments 220, 230 have diameters that allow them to receive the second conduit 20 therethrough. With the second conduit 20 inserted into the coupling sleeve 200, the compression nut 300 can be tightened, compressing the compression ring 60 about the second conduit 20 and gripping the second conduit 20 to secure the second conduit 20 to the first conduit 10 end-to-end.

Referring to FIGS. 3B, 4A, 4B, and 4C, alternative stop seal rings 400A, 400B, 400C may have configurations that are different from stop seal ring 400. In FIG. 3B, the stop seal ring 400 has a substantially rectangular cross-section. FIG. 4A shows an L-shaped version of the stop seal ring 400A, with a foot portion 410A that is squeezed between the stop flange 210 and the first conduit end 14, and a leg portion 420A that extends over the outside of the first conduit 10. FIG. 4B shows a T-shaped version of the stop seal ring 400B, with a stop ring protrusion 410B that has a pointed tip extending from a stop ring body 420B. The stop ring protrusion 410B is squeezed between the stop flange 210 and the first conduit end 14, and the stop ring body 420B partially extends over the stop flange 210 and the outside of the first conduit 10. FIG. 4C also shows a T-shaped version of the stop seal ring 400C, but with a stop ring protrusion 410C that is rounded extending from a stop ring body 420C.

It must be kept in mind that the assemblies shown in the accompanying drawings and discussed above are merely exemplary, and may assume a wide variety of configurations and relative sizes different from those noted, and may use components different from those noted. It also should be understood that various terms referring to orientation and position used throughout this document are relative terms rather than absolute ones. Also, it is to be understood that such terms as "forward," "rearward," "left," "right," "upwardly," "downwardly," and the like are words of convenience and are not to be construed as limiting terms.

Various preferred versions of the invention are shown and described above to illustrate different possible features of the invention and the varying ways in which these features may be combined. Apart from combining the different features of the foregoing versions in varying ways, other modifications are also considered to be within the scope of the invention. For example, the first and second segments 220, 230 of the coupling sleeve 200 can be provided with different diameters to accommodate different sizes of conduits 10, 20, and/or to fit with conduits without expanded end portions 12. The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A coupling assembly for securing two conduits together end-to-end,
    a. the coupling assembly comprising:
        i. a coupling sleeve having a sleeve first segment and an externally-threaded sleeve second segment, the sleeve first and second segments being situated on opposing sides of a stop flange, wherein the stop flange protrudes radially outwardly from the coupling sleeve;
        ii. a compression nut having an internally threaded nut first segment extending from a nut second segment, the nut first segment being dimensioned to fit about and threadably engage the sleeve second segment;
        iii. a stop seal ring sized to complementarily fit about the sleeve first segment without sliding past the stop flange;
    b. wherein the coupling assembly is configured to secure a first conduit to a second conduit end-to-end such that:
        iv. the stop seal ring is situated about the sleeve first segment, the sleeve first segment is positioned within the first conduit, and the stop seal is pressed between the stop flange and a first conduit end;
        v. the compression nut threadably engages the nut first segment about the sleeve second segment;
        vi. the second conduit is positioned within the compression nut and the coupling sleeve, wherein the second conduit extends past the stop flange of the coupling sleeve; and
        vii. rotating the compression nut threadably engages the compression nut with the sleeve second segment.

2. The assembly of claim 1 wherein the sleeve first segment is crimped with the first conduit to secure the coupling sleeve with the first conduit.

3. The assembly of claim 2 wherein:
    a. the first conduit includes an expanded end; and
    b. the coupling sleeve is configured to be secured to the first conduit by crimping the sleeve first segment with the expanded end of the first conduit.

4. The assembly of claim 1 wherein:
    a. the first conduit has an expanded end that is wide enough to complementarily receive the sleeve first segment therein; and
    b. the sleeve second segment is wide enough to receive the second conduit therethrough.

5. The assembly of claim 1, wherein:
    a. the first conduit has a first conduit radius except at an expanded end, the expanded end having an expanded end radius that is greater than the first conduit radius; and
    b. the second conduit has a second conduit radius.

6. The assembly of claim 5 wherein:
    a. the sleeve first segment has a sleeve first segment radius that is:
        i. larger than the first conduit radius; and
        ii. smaller than the expanded end radius;

b. the sleeve second segment has a sleeve second segment radius that is larger than the second conduit radius.

7. The assembly of claim 6 wherein:
a. the nut first segment has a nut first segment radius, and the nut second segment has a nut second segment radius;
b. the nut first segment radius is larger than sleeve second segment radius; and
c. the nut second segment radius is larger than the second conduit radius.

8. The assembly of claim 1 wherein the coupling assembly is configured to secure two conduits together end-to-end without rotation of either conduit.

9. The assembly of claim 1 wherein the stop seal ring has an L-shaped cross-section.

10. The assembly of claim 1 wherein the stop seal ring has a T-shaped cross-section with a stop ring protrusion extending from a stop ring body, wherein the stop ring protrusion is squeezed between the stop flange and the first conduit end when first and second conduits are secured to each other end-to-end.

11. The assembly of claim 10 wherein the stop ring protrusion is pointed.

12. The assembly of claim 10 wherein the stop ring protrusion is rounded.

13. The assembly of claim 10 wherein the stop ring protrusion is flat.

14. The assembly of claim 10 wherein when first and second conduits are secured to each other end-to-end, the stop ring body:
a. at least partially covers the stop flange; and
b. extends at least partly over the first conduit.

15. The assembly of claim 1:
a. further including a seal ring, a friction ring, and a compression ring;
b. wherein when a first conduit is secured to a second conduit with the compression nut tightened about the sleeve second segment and the second conduit,
   i. the seal ring, friction ring, and compression ring fit about the second conduit;
   ii. the compression ring compresses to grip the second conduit.

16. A method of securing two conduits together end-to-end, the method comprising:
a. providing a coupling assembly including:
   i. a coupling sleeve having a sleeve first segment and an externally-threaded sleeve second segment, the sleeve first and second segments being situated on opposing sides of a stop flange, wherein the stop flange protrudes radially outwardly from the coupling sleeve;
   ii. a compression nut having an internally threaded nut first segment extending from a nut second segment, the nut first segment being dimensioned to fit about and threadably engage the sleeve second segment;
   iii. a stop seal ring sized to complementarily fit about the sleeve first segment without sliding past the stop flange;
b. with the stop seal situated about the sleeve first segment, inserting the sleeve first segment into a first conduit until the stop seal is pressed between the stop flange and a first conduit end;
c. rotating the compression nut to threadably engage the nut first segment about the sleeve second segment;
d. inserting a second conduit through the compression nut and into the coupling sleeve until the second conduit extends past the stop flange of the coupling sleeve; and
e. rotating the compression nut to further threadably engage the compression nut with the sleeve second segment.

17. The method of claim 16 wherein:
the first conduit includes an expanded end;
the method further includes the step of crimping the sleeve first segment with the expanded end of the first conduit to secure the coupling sleeve to the first conduit.

18. A coupling assembly for securing two conduits together end-to-end,
a. the coupling assembly comprising:
   i. a coupling sleeve having a sleeve first segment and an externally-threaded sleeve second segment, the sleeve first and second segments being situated on opposing sides of a stop flange, wherein the stop flange protrudes radially outwardly from the coupling sleeve;
   ii. a compression nut having an internally threaded nut first segment extending from a nut second segment, the nut first segment being dimensioned to fit about and threadably engage the sleeve second segment;
   iii. a T-shaped stop seal ring sized to complementarily fit about the sleeve first segment without sliding past the stop flange, the stop seal ring having a stop ring protrusion extending from an elongated stop ring body; and
   iv. a first conduit and a second conduit, the first conduit having an expanded end;
b. wherein the coupling assembly is configured to secure the first conduit to the second conduit end-to-end such that:
   i. the stop seal ring is situated about the sleeve first segment, the sleeve first segment is positioned within the first conduit and the stop ring protrusion is squeezed by the stop flange and a first conduit end;
   ii. the compression nut threadably engages the nut first segment about the sleeve second segment;
   iii. the second conduit is positioned through the compression nut and into the conduit sleeve such that the second conduit extends past the stop flange of the coupling sleeve and enters the sleeve first segment; and
   iv. the compression nut threadably engages the compression nut with the sleeve second segment, and the stop ring protrusion is pressed between the stop flange and the first conduit end.

\* \* \* \* \*